(12) United States Patent
Yamamoto et al.

(10) Patent No.: US 6,991,377 B2
(45) Date of Patent: Jan. 31, 2006

(54) BEARING DEVICE

(75) Inventors: Hiroshi Yamamoto, Kanagawa-ken (JP); Daijiro Ito, Kanagawa-ken (JP); Takeshi Nishide, Kanagawa-ken (JP)

(73) Assignee: Komatsu Limited, Tokyo (JP)

( * ) Notice: Subject to any disclaimer, the term of this patent is extended or adjusted under 35 U.S.C. 154(b) by 129 days.

(21) Appl. No.: 10/639,817

(22) Filed: Aug. 13, 2003

(65) Prior Publication Data

US 2004/0042698 A1 Mar. 4, 2004

(30) Foreign Application Priority Data

Aug. 27, 2002 (JP) ............................ P2002-247466

(51) Int. Cl.
*F16C 17/02* (2006.01)

(52) U.S. Cl. ...................................... 384/291; 384/276
(58) Field of Classification Search ................ 384/276, 384/283, 286–293, 625
See application file for complete search history.

(56) References Cited

U.S. PATENT DOCUMENTS

| 2,572,021 | A | * | 10/1951 | Folz ............................ 384/291 |
| 3,841,716 | A | | 10/1974 | Webber et al. |
| 4,105,267 | A | * | 8/1978 | Mori ............................ 384/291 |
| 5,433,532 | A | * | 7/1995 | Kawageo et al. ............ 384/291 |
| 5,462,362 | A | * | 10/1995 | Yuhta et al. ................... 384/13 |
| 6,585,419 | B2 | * | 7/2003 | Ono et al. ................... 384/292 |
| 6,698,932 | B2 | * | 3/2004 | Hamaguchi et al. ......... 384/275 |

FOREIGN PATENT DOCUMENTS

JP 9-68217 3/1997

* cited by examiner

*Primary Examiner*—Thomas R. Hannon
(74) *Attorney, Agent, or Firm*—Everest Intellectual Property Law Group

(57) ABSTRACT

A bush is provided at its sliding surface with oil-supply groove portions. An area ratio of the oil-supply groove portions to the sliding surface of the journal shaft is set to 30 to 90%. A length $L_1$ between the oil-supply groove portions in a circumferential direction and an inner diameter D of the bearing satisfy $L_1 < \pi D/36$. Even in a bearing device in which the journal shaft and the bush mutually rotate in a predetermined angle range or in which the journal shaft and the bush relatively and continuously rotate, the present invention can effectively be used while maintaining the existing sizes of the journal shaft and the bush, and it is possible to prevent partial break of oil film or shortage of oil film.

5 Claims, 8 Drawing Sheets

BEARING DEVICE

BACKGROUND OF THE INVENTION

1. Field of the Invention

The present invention relates to a bearing device for various machines having a shaft member which relatively rotates in a cylindrical bearing through an oil film of lubricant, and more particularly, to a bearing device capable of preventing damage, wear, excessive heating and seizure of the device.

2. Description of the Prior Art

Conventionally, a bearing device which rotatably supports a shaft member in a bearing is widely used for various connected portion in construction equipment, earthmoving equipment, general equipment of hydraulic machine and the like. In the bearing device of this kind, lubricant for preventing internal wear is filled in sliding surfaces between a rotation shaft and a bearing which supports the rotation shaft. As the rotation shaft rotates, the lubricant is introduced into the sliding surfaces between the rotation shaft and the bearing to form a thin oil film. In this bearing device, when the rotation shaft is stopped or actuated or when fluctuating load is applied from outside, for example, the oil film is partially broken in some cases. If the oil film is partially broken or there is shortage of oil film, there are problems that a contact pressure between the rotation shaft and the bearing is increased, and friction heat caused by the contact pressure generates seizure between the rotation shaft and the bearing.

Japanese Patent Application Laid-open No. 9-68217, for example, discloses a bearing device which makes it possible to prevent the seizure of the bearing or the rotation shaft. According to this bearing device disclosed in this publication, a sliding surface of either one of a bearing and a rotation shaft is provided with a large number of machined surface portions having asperities of substantially trapezoidal cross sections along an axial direction or a rotation direction of the rotation shaft. The machined surface portions are formed at distances of several tens $\mu$m to several hundreds $\mu$m at intervals.

In the bearing device having the machined surface portions along the axial direction of the rotation shaft at intervals, a ratio of a mean upper base length to a mean lower base length of the substantially trapezoidal shapes of the machined surface portions is set to 0.6 or more and less than 1.0. In the bearing device having the machined surface portions in the rotation direction of the rotation shaft at intervals, a ratio of the mean upper base length to the lower base length of the substantially trapezoidal shapes of the machined surface portions is set to more than 0 and 0.6 or less.

With such shapes of the machined surface portions of the bearing device, oil film holding function of the lubricant is enhanced, and the oil film can be generated stably. Therefore, there is merit that the friction heat between the rotation shaft and the bearing is reduced, and the seizure in the rotation shaft or the bearing can be suppressed.

Generally, in a bearing device in which a rotation shaft and a bearing relatively slide on each other through an oil film of lubricant which is circulated and supplied to between the rotation shaft and the bearing, if a large number of oil-supply auxiliary groove portions for circulating and supplying the lubricant supplied from the oil-supply groove portion are provided on sliding surfaces between the rotation shaft and the bearing in addition to a main oil-supply groove portion which is directly connected to a lubricant supply source, a circulation and supply amount of the lubricant can be increased. However, if the number of oil-supply auxiliary groove portions is increased, although the seizure between the rotation shaft and the bearing is reduced, lengths in the rotation direction of land portions (sliding surfaces between the rotation shaft and the bearing) between the large number of oil-supply auxiliary groove portions are shortened, and an area of the sliding surfaces between the rotation shaft and the bearing is reduced. As a result, the contact pressure between the rotation shaft and the bearing is increased, and seizure is prone to be generated between the rotation shaft and the bearing by the friction heat caused by the contact pressure.

In order to overcome such inconvenience, a diameter of the rotation shaft and an inner diameter of the mating bearing are set greater and axial lengths of both the rotation shaft and the bearing are also increased so as to increase an area of the sliding surfaces between the rotation shaft and the bearing without changing the size of the oil-supply groove portion. That is, if the length of the land portion between the oil-supply auxiliary groove portions in the rotation direction and the axial direction is set longer, the area of the sliding surface between the rotation shaft and the bearing can be increased, and the contact pressure can be dispersed. However, if the diameter of the rotation shaft and the inner diameter of the mating bearing are set greater and the axial length is also set greater, there is a defect that the bearing device is naturally increased in size.

When the bearing device disclosed in the Japanese Patent Application Laid-open No. 9-68217 is used in a general apparatus in which a bearing and a rotation shaft continuously rotate relatively in one direction at high speed and under a high load, new lubricant is circulated and supplied to each sliding surface between the rotation shaft and the bearing through a recess of the machined surface portion, and the lubricant is prone to cause an adhesion state in which the entire surfaces of the rotation shaft and the bearing are coated.

On the other hand, in a bearing device mounted on a connection part of a utility machine of construction equipment or earthmoving equipment in which a rotation shaft and a bearing reciprocate and rotate through a predetermined angle at low speed and under a high load, relative sliding speed between an outer peripheral surface of the rotation shaft and an inner peripheral surface of the bearing is extremely slow, and the rotation shaft reciprocates and rotates through a same angle region a plurality of times in accordance with rocking motion of the utility machine. As a result, a large load is always applied in the contact angle region, the lubricant which is circulated and supplied to between the rotation shaft and the bearing is not prone to adhere to the entire surfaces of the rotation shaft and the bearing, and cut of oil film in which the oil film is partially broken or the shortage of oil film is prone to be generated.

When the bearing device disclosed in the above publication is used to the connection part of the utility machine of the construction equipment or the earthmoving equipment, even if sufficient lubricant can be circulated and supplied by the large number of oil-supply auxiliary groove portions, if the area of the sliding surfaces between the rotation shaft and the bearing is small, the contact pressure in the sliding surfaces between the rotation shaft and the bearing becomes extremely high. Therefore, in the bearing device of the connection part of the utility machine, it becomes difficult to obtain sufficient lubricating effect between the outer peripheral surface of the rotation shaft and the inner peripheral surface of the bearing.

As a result, abrasion, wear, excessive heat and the like are prone to be generated in the rotation shaft and the bearing due to the partial oil film break and the shortage of oil film, and the seizure is prone to be generated in the rotation shaft and the bearing due to the friction heat caused by the contact pressure. Further, if the oil film is broken or the like, vibration or noise is generated and thus, the performance of the construction equipment or the earthmoving equipment may be seriously deteriorated. Therefore, the bearing device disclosed in the above publication cannot exhibit the satisfactory lubricating effect with respect to the sliding surfaces between the rotation shaft and the bearing in the bearing device used under conditions of low speed, low rocking angle and high load such as the utility machine above.

In the bearing device disclosed in the publication, the oil film is stably generated by forming the large number of machined surface portions having specific shape along the axial direction or the rotation direction of the rotation shaft, and it is expected to suppress the seizure of the rotation shaft and the bearing. That is, as in the low speed rocking and high load bearing device mounted on the connection part for the utility machine in the construction equipment or the earthmoving equipment mentioned above, a bearing device in which a utility machine is rocked in the entire region from a determined small rocking region to a determined large rocking region and sliding motion having large contact pressure between the rotation shaft and the bearing is carried out, even if the above bearing device is employed, it is extremely difficult to reduce the sliding resistance as well as the seizure of the rotation shaft and the bearing because of its structure.

The bearing device for low speed rocking and high load cannot secure wear resistance and seizure resistance only by changing the shape of the machined surface portions, and it is not possible to solve the conventional technical problems that the shortage or break of oil film is generated, and seizure is prone to be generated in the rotation shaft and the bearing.

SUMMARY OF THE INVENTION

The present invention has been accomplished to solve the conventional problems, and it is a concrete object of the invention to provide a bearing device for various machines in which the number of parts is small and the structure is simple like the conventional bearing device, and lubricating effect, load resistance, wear resistance and seizure resistance can be maintained excellently.

The inventors of the invention repeated study to solve the above problems, and found that if a ratio of area of the oil-supply groove portion to either one of sliding surfaces of the bearing and the shaft member was set to a predetermined value, the contact pressure in the sliding motion between the shaft member and the bearing could be reduced without generating the partial oil film break or shortage of oil film, even if the rotation angle at which the bearing and the shaft member relatively slid with each other is small. Unexpected effect could be obtained without generating the wear or seizure between the shaft member and the bearing, and the inventors achieved the new invention which could not be anticipated previously.

The present invention, provides a bearing device for various kinds of machines, comprising a shaft member which is relatively and rotatably supported by a cylindrical bearing through an oil film of lubricant, wherein oil-supply groove portions of lubricant formed on a sliding surface of either one of the bearing and the shaft member, and an area ratio of the oil-supply groove portions to the sliding surface of either one of the bearing and the shaft member is 30 to 90%.

The present invention is predicated on that the bearing or the shaft member must have adjacent oil-supply groove portions in a predetermined rotation angle range. It is preferable that the area ratio of the oil-supply groove portions to the sliding surface of either one of the bearing and the shaft member is 30 to 90%. If the area ratio of the oil-supply groove portions to the sliding surface of either one of the bearing and the shaft member is 30 to 90%, it is possible to obtain sufficient lubricating effect between the sliding surfaces of the bearing and the shaft member without generating the partial oil film break and shortage of oil film. If the area ratio is smaller than 30%, it is difficult to obtain a desired seizure load, and if the area ratio exceeds 90%, load resistance of the sliding surfaces of the bearing and the shaft member cannot sufficiently be obtained. As a result, abnormal wear, abrasion, seizure and the like are increased, or the damage is prone to be generated, and a long lifetime of the bearing device under a rigorous using condition cannot be obtained.

Therefore, in the present invention, even in a bearing device in which the bearing and the shaft member mutually rotate at a predetermined angle range or in which the bearing and the shaft member relatively and continuously rotate, lifetime of the bearing and the shaft member can be elongated while maintaining sizes of the bearing and the shaft member without increasing said sizes.

Even if the rotation angle at which the bearing and the shaft member relatively slide with each other is small, it is possible to prevent wear, abrasion, seizure and the like of the sliding surfaces of the bearing and the shaft member, and it is possible to largely enhance the endurance and seizure resistance of the sliding surfaces. As a result, with a small number of parts and a simple structure, no vibration or noise is generated, and it is possible to ensure the quality of the bearing device for a long term.

Furthermore, in the present invention, it is preferable that a length $L_1$ between the oil-supply groove portions in the circumferential direction and an inner diameter D of the bearing satisfy $L_1 < \pi D/36$. That is, it is preferable that the length (land length) $L_1$ between the oil-supply groove portions in the circumferential direction is set to smaller than a value obtained by equally dividing a length ($\pi D$) of the inner peripheral surface of the bearing by 36, and the area ratio of the oil-supply groove portions is set in the range of 30 to 90%.

According to this structure, the sliding surfaces between the bearing and the shaft member can slide under an appropriate contact pressure. It becomes unnecessary to set larger the inner diameter of the bearing, the diameter of the shaft member and a length thereof in its axial direction, the bearing device itself is prevented from being increased in size, and the above-described effects are reliably exhibited.

In the present invention, it is preferable that a surface of either one of the bearing and the shaft member is subjected to induction hardening. According to this structure, single or multi races which are parallel to one another can be formed as the oil-supply groove portions inexpensively.

DESCRIPTION OF THE PREFERRED EMBODIMENTS

Preferred embodiments of the present invention will be explained concretely based on the accompanying drawings.

The invention can effectively be used for a bearing device for construction equipment, earthmoving equipment, industrial machines and the like. The embodiment will be explained for a case of a connection part in a utility machine such as a boom or an arm mounted to an excavator which is construction equipment or earthmoving equipment (not shown). Yet, the invention is not limited only to the connection part of the utility machine for the excavator, but the invention can also be effectively applied to various connection parts in the utility machine, and to a bearing device of a general machine such as various hydraulic machine and a compressor in an industrial field other than the construction equipment or the earthmoving equipment of course.

Figure 1:
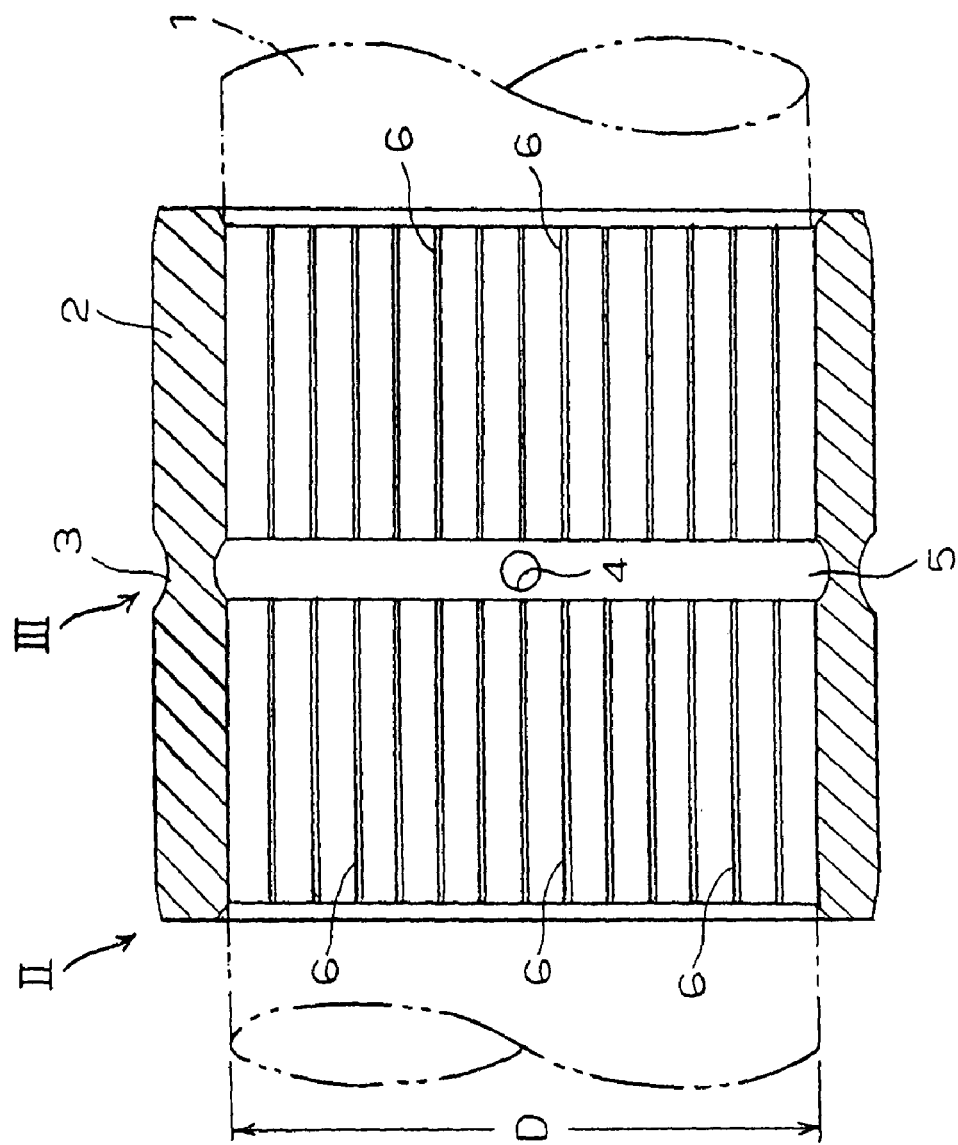
FIG. 1 is a schematic sectional view showing an example of a structure of a bearing which constitutes a portion of a bearing device according to a first embodiment of the present invention.
Figure 2:
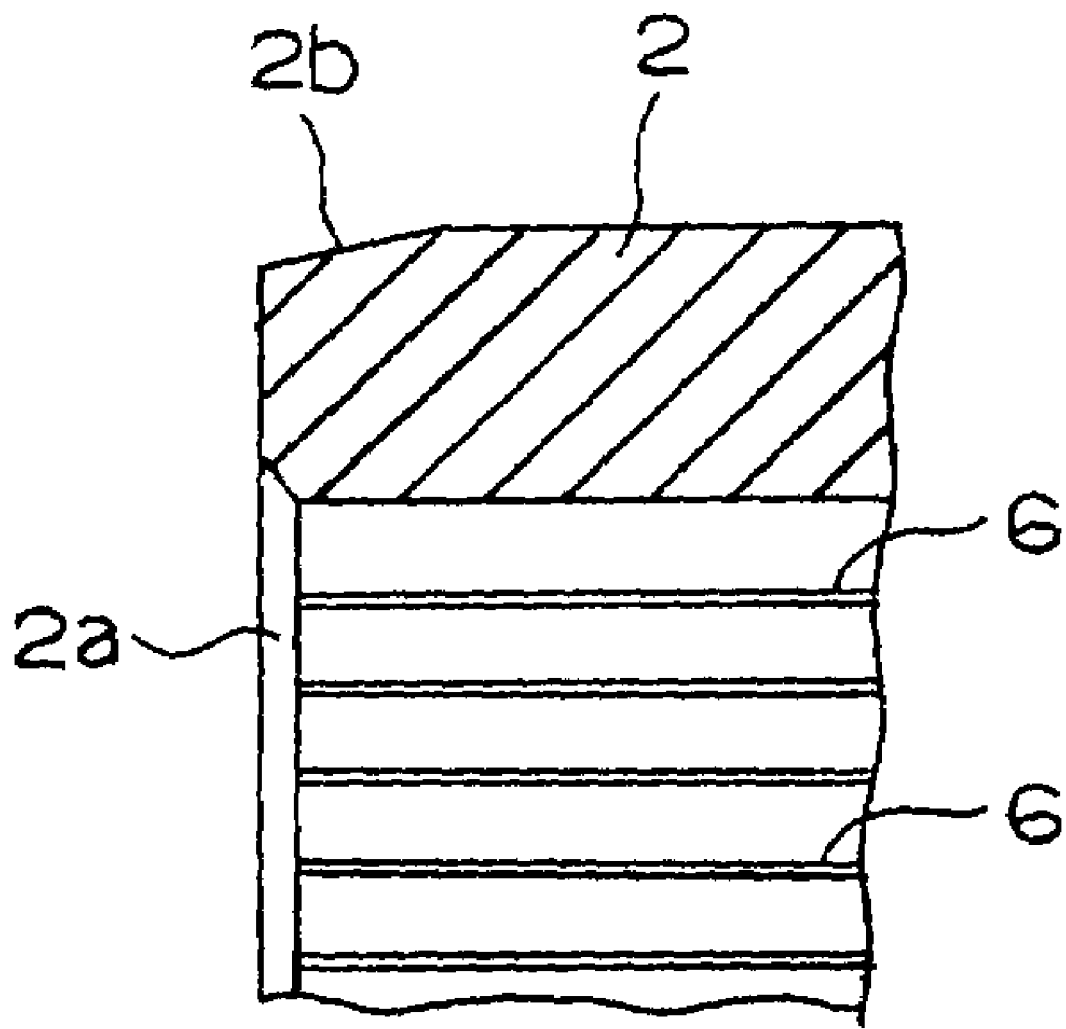
FIG. 2 is an enlarged view showing an end portion of the bearing at an arrow II portion in FIG. 1.
Figure 3:
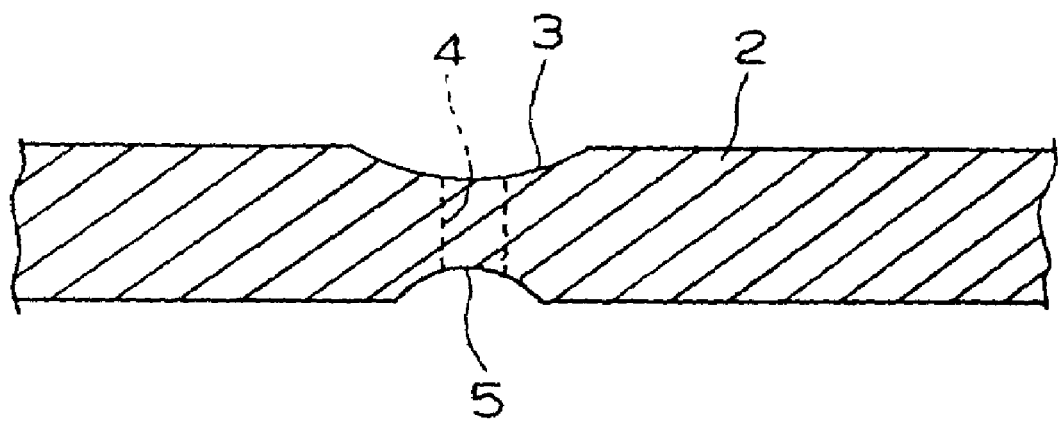
FIG. 3 is an enlarged view showing a peripheral portion of the bearing at an arrow III portion in FIG. 1.
Figure 4:
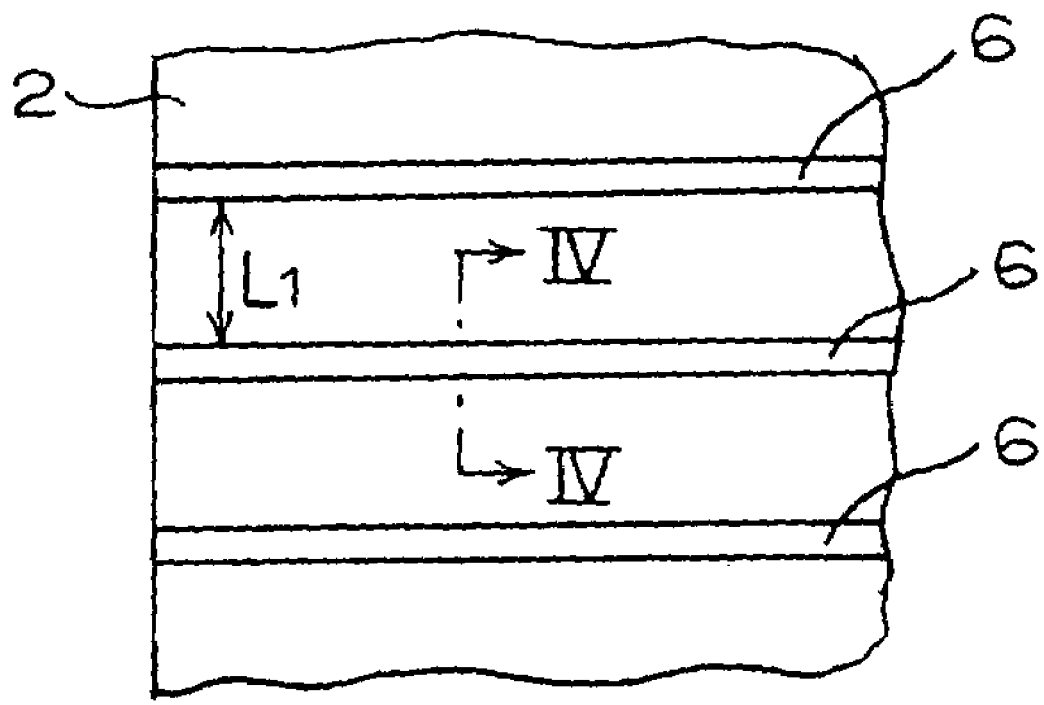
FIG. 4 is an enlarged view showing an oil-supply groove portion of the bearing.
Figure 5:
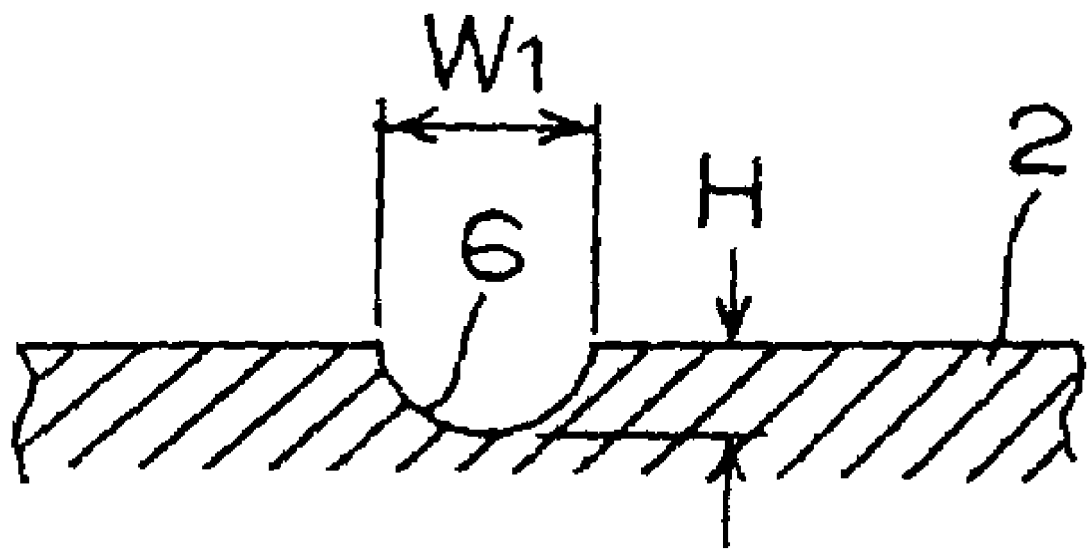
FIG. 5 is an enlarged sectional view of the oil-supply groove portion taken along a line IV—IV in FIG. 4.

FIGS. 1 to 5 schematically show a structure of a bearing constituting a portion of a bearing device according to a representative first embodiment of the present invention. FIG. 1 is a schematic sectional view of the bearing. FIG. 2 is an enlarged view showing an end portion of the bearing at an arrow II in FIG. 1. FIG. 3 is an enlarged view showing a peripheral portion of the bearing at an arrow III in FIG. 1. FIG. 4 is an enlarged view showing an oil-supply groove portion of the bearing. FIG. 5 is an enlarged sectional view of the oil-supply groove portion taken along a line IV—IV in FIG. 4.

In these drawings, the bearing device is applied to the connection part of the utility machine which connects an arm and a bucket mounted to an excavator (not shown). The bearing device includes a journal shaft 1 as a shaft member. The journal shaft 1 is fixed and supported between a pair of brackets of the bucket (not shown). A cylindrical boss (not shown) is rotatably fitted over the journal shaft 1. A cylindrical bush 2 as a mating bearing which comes into slide contact with the journal shaft 1 is fixed and supported on an inner periphery of the boss.

The boss is rotatably supported by the journal shaft 1 through the bush 2 and is fixed and supported at a tip end of the arm. A dust oil seal material (not shown) is coaxially fitted and fixed to opening edge portions at opposite ends of the boss. An oil reservoir is defined between an outer peripheral surface of the journal shaft 1 and an inner peripheral surface of the bush 2 by the dust oil seal material. The oil reservoir is filled with lubricant. When the excavator (not shown) using the bearing device having the above-described structure is actuated, if the bucket which is rockably connected to the arm rocks, the journal shaft 1 and the bush 2 rotate mutually.

Since the connection part of the utility machine having the above-described structure has a general structure, detailed explanation thereof is omitted here, and a sliding portion between the journal shaft 1 and the bush 2 constituting a characteristic part of the invention will be explained concretely. In the present invention, a sliding surface of either one of the journal shaft 1 and the bush 2 has oil-supply groove portions 5 and 6 for lubricant constituting a portion of the characteristic part of the invention. The embodiment is explained for a case of the structure of the bush 2. Yet, the invention is not limited to this, and the invention can also be applied to the journal shaft 1, of course.

In this embodiment, the bush 2 is made of desired steel material which is defined by JIS. It is preferable that the surface hardness of the bush 2 is HRC 50 or higher, and HRC 52 to 60 is especially preferable. Further, it is possible to form a thin film layer having excellent oil holding function of lubricant on an inner peripheral surface of the bush 2 by a film-forming processing technique.

As shown in FIG. 2, opening edge portions of opposite ends of the bush 2 are formed with inner tapered surfaces 2a so that the journal shaft 1 can easily be inserted. In addition, outer edge portions of the opposite ends of the bush 2 are formed with outer tapered surfaces 2b having a gradient smaller than that of the inner tapered surface 2a so that the bush 2 can easily be press fitted into the boss. As shown in FIG. 3, a central portion of the outer peripheral surface of the bush 2 is straightly formed with an arc lubricant flow path 3 in a circumferential direction of the bush.

The arc first oil-supply groove portion 5 is formed on the central portion of the inner peripheral surface of the bush 2 along the lubricant flow path 3. The oil-supply groove portion 5 is in communication with the lubricant flow path 3 through a communication hole 4 which opens at upper and lower surfaces of the bush 2. A diameter of the oil-supply groove portion 5 is set smaller than that of the lubricant flow path 3.

Moreover, according to this embodiment, in the inner peripheral surface of the bush 2, arc second oil-supply groove portions 6 for circulating and supplying lubricant which is supplied from the oil-supply groove portion 5 are straightly disposed from opposite end edges of the first oil-supply groove portion 5 to the opening end edges of the bush. In the illustrated example, a plurality of second oil-supply groove portions 6 are arranged at equal distances from one another on a same circumferential surface along an axial direction of the bush, and the inner peripheral surface of the bush 2 has convexoconcave. As shown in FIG. 4, a width of the second oil-supply groove portion 6 is set smaller than that of the first oil-supply groove portion 5.

The second oil-supply groove portions 6 can be arranged from the oil-supply groove portion 5 to the opening end edge of the bush, or can be arranged in a region from the oil-supply groove portion 5 to vicinity of the opening end edge of the bush. The shapes of the oil-supply groove portions 5 and 6 are not limited to those shown in the illustrated example, and the shapes can be rectangular or triangular.

In general, in the bearing device in which the journal shaft 1 and the bush 2 relatively slide through an oil film of lubricant, if the sliding surfaces between the journal shaft 1 and the bush 2 is small, the contact pressure in the sliding motion between the journal shaft 1 and the bush 2 becomes high. Therefore, seizure is generated in the journal shaft 1 or the bush 2 due to the friction heat caused by the contact pressure. If the sliding surfaces between the journal shaft 1 and the bush 2 can be set larger, it is possible to reduce the contact pressure in the sliding motion between the journal shaft 1 and the bush 2, and it is possible to elongate the lifetime of the bearing device without generating the seizure in the journal shaft 1 or the bush 2 by the friction heat caused by the contact pressure. However, if the diameter of the journal shaft 1 and the inner diameter of the mating bush 2 are set larger and the lengths thereof in the axial direction are also set larger so as to increase the sliding surface area between the journal shaft 1 and the bush 2 as described above, the size of the bearing device is naturally increased.

The most characteristic part of the invention is that an area ratio of the oil-supply groove portions 6 to the sliding surface of the journal shaft 1 is set to 30 to 90%. It is important that there exist adjacent second oil-supply groove portions 6 without fail over the determined rotation region in a rotation angle of the journal shaft 1.

In this embodiment, a groove width $W_1$ of the second oil-supply groove portion 6 and an inner diameter D of the bush 2 have a relation of $0<W_1/D<0.5$. A groove width $W_2$ of a lower bottom of the second oil-supply groove portion 6 has a size relation of $W_2 \leq W_1$. The second oil-supply groove portions 6 are formed on the inner peripheral surface of the bush 2 at predetermined distances from each other using a broaching machine or knurling working using a lathe or a conventional NC lathe. It is preferable that the area ratio of the second oil-supply groove portions 6 to the sliding surface of the journal shaft 1 is set to 30 to 90%.

If the area ratio of the second oil-supply groove portions 6 is 30 to 90%, it is possible to obtain sufficient lubricating effect between the sliding surfaces of the journal shaft 1 and the bush 2. If the area ratio is smaller than 30%, it is difficult to obtain a desired seizure load, and if the area ratio exceeds 90%, load resistance of the sliding surfaces of the journal shaft 1 and the bush 2 cannot sufficiently be obtained. As a result, abnormal wear, abrasion, seizure and the like are increased, and quality of the bearing device cannot be secured.

In the second oil-supply groove portion 6, a length (land length) $L_1$ between the groove portions in the circumferential direction and the inner diameter D (=2R) of the bush 2 have a size relation of $L_1 < \pi R/18$. A length $L_1$ in the circumferential direction and a groove depth H of the second oil-supply groove portion 6 have a relation of $H<2L_1$, and more preferably, $H \leq L_1/2$. It is preferable that the groove depth H of the second oil-supply groove portion 6 is set greater than 0.01 mm.

It is especially preferable that the land length $L_1$ and the inner diameter D of the bush 2 have a relation of $L_1<\pi D/36$. That is, the land length $L_1$ is set to smaller than a value obtained by equally dividing a length ($\pi D$) of the inner peripheral surface of the bush 2 by 36. This is predicated on that the area ratio of the second oil-supply groove portions 6 is 30 to 90%. With this structure, the sliding surfaces between the journal shaft 1 and the bush 2 can slide with each other with excellent contact pressure, and the bearing device itself can also be reduced in size without making larger the inner diameter of the bush 2, the diameter of the journal shaft 1 and the length thereof in its axial direction.

By appropriately setting the inner diameter D of the bush 2 and the width with $W_1$ of the second oil-supply groove portion 6, it is possible to reduce the contact pressure of the sliding motion between the journal shaft 1 and the bush 2 without generating the partial break of the oil film or the shortage of oil film even if the rotation angle through which the journal shaft 1 and the bush 2 relatively slide with each other is small, and the wear and seizure between the journal shaft 1 and the bush 2 are not generated.

Figure 6:
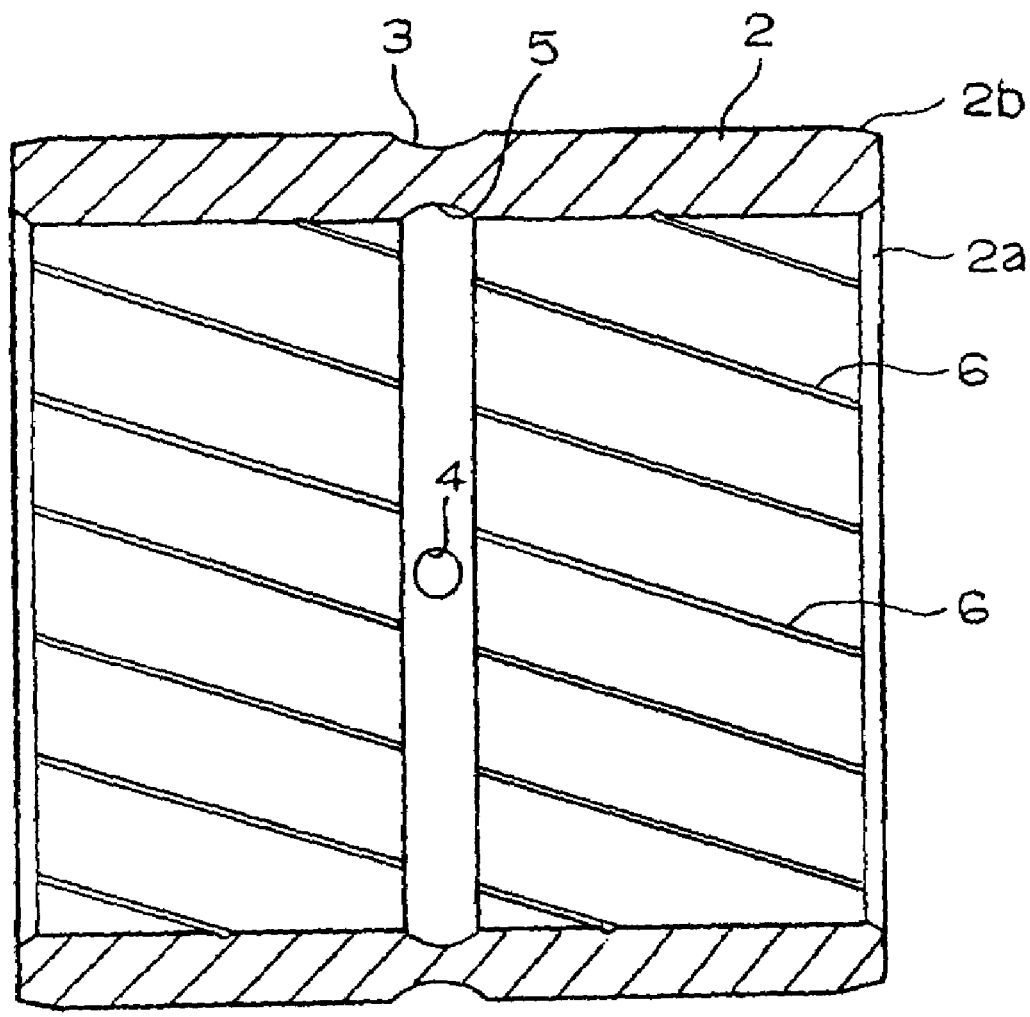
FIG. 6 is a vertical sectional view of a bearing according to a second embodiment of the invention.
Figure 7:
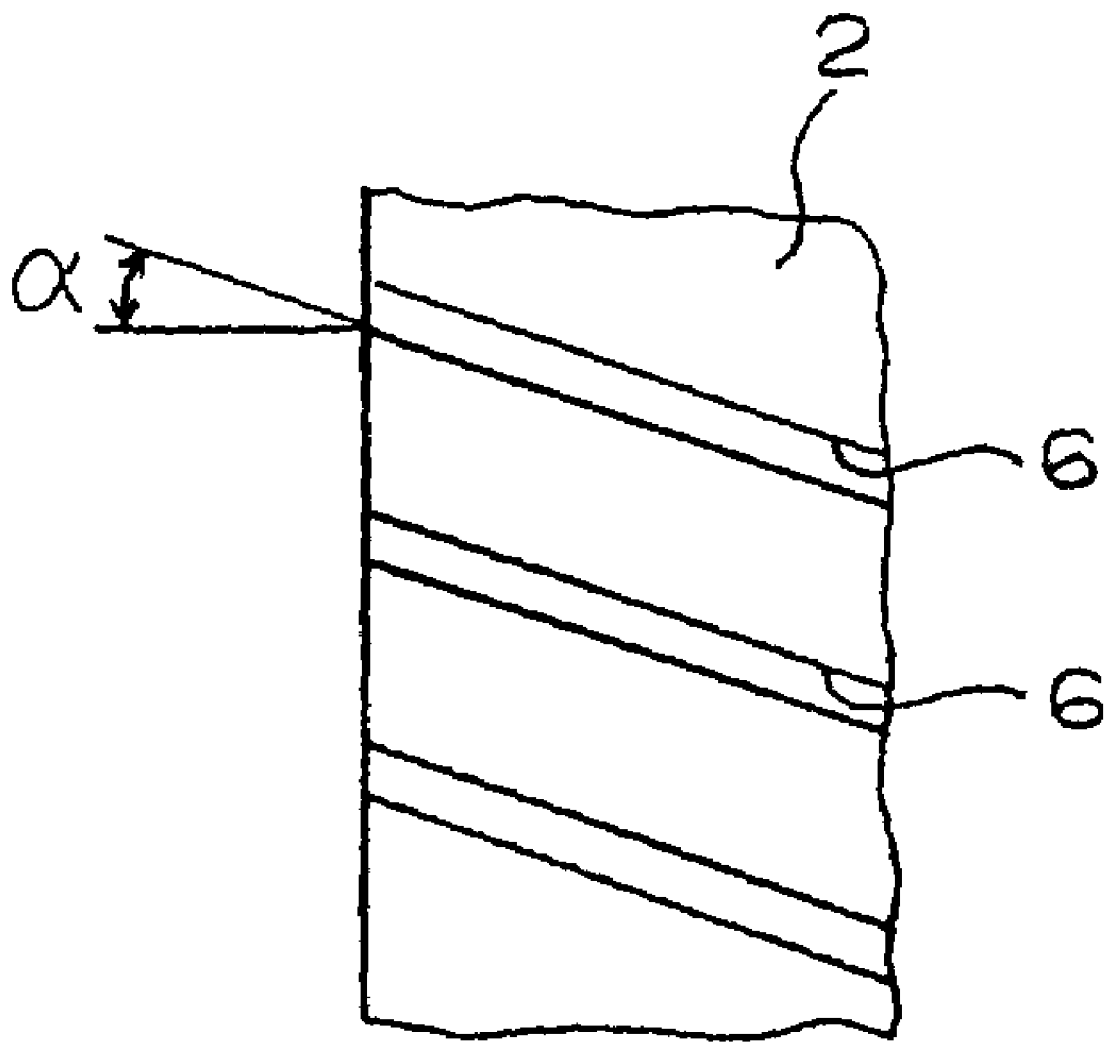
FIG. 7 is an enlarged view showing an oil-supply groove portion of the bearing.

FIGS. 6 and 7 show the second embodiment of a bearing which is a partial constituting member of the bearing device of the invention. FIG. 6 is a vertical sectional view of the bearing, and FIG. 7 is an enlarged view showing oil-supply groove portions of the bearing.

A structure of the second embodiment is basically the same as that of the bearing device of the first embodiment except that the inner peripheral surface of the bush 2 which is a bearing is formed with second oil-supply groove portions 6 which are inclined at a predetermined angle α. Therefore, in FIGS. 6 and 7, substantially the same members as those in the first embodiment are designated with the same names and numerals, and detailed explanation of these members is omitted.

In FIGS. 6 and 7, the second oil-supply groove portions 6 which are inclined with respect to the axial direction of the bush at the predetermined inclination angle α are helically formed on the inner peripheral surface of the bush 2, and a plurality of the second oil-supply groove portions 6, . . . 6 are arranged at equal distances from one another on the same circumferential surface. The inner peripheral surface of the bush 2 can be formed with single or multi races which are in parallel to one another, and the angle α of the second oil-supply groove portions 6 with respect to the axial direction of the bush 2 is $0°<\alpha<90°$.

The load resistance, wear resistance and the seizure resistance of the oil-supply groove portions 6 of this second embodiment are more excellent than those of the first embodiment. It is preferable that after the second oil-supply groove portions 6 are formed on the inner peripheral surface of the bush 2, the inner peripheral surface of the bush 2 is subjected to induction hardening. It is possible to easily and inexpensively form single or multi races of desired shape having shallow depth of the second oil-supply groove portion 6. It is of course possible to extremely enhance the wear resistance, seizure resistance and the like of the bush 2.

A further concrete embodiment of the present invention will be explained below together with a comparative example.

Figure 8:
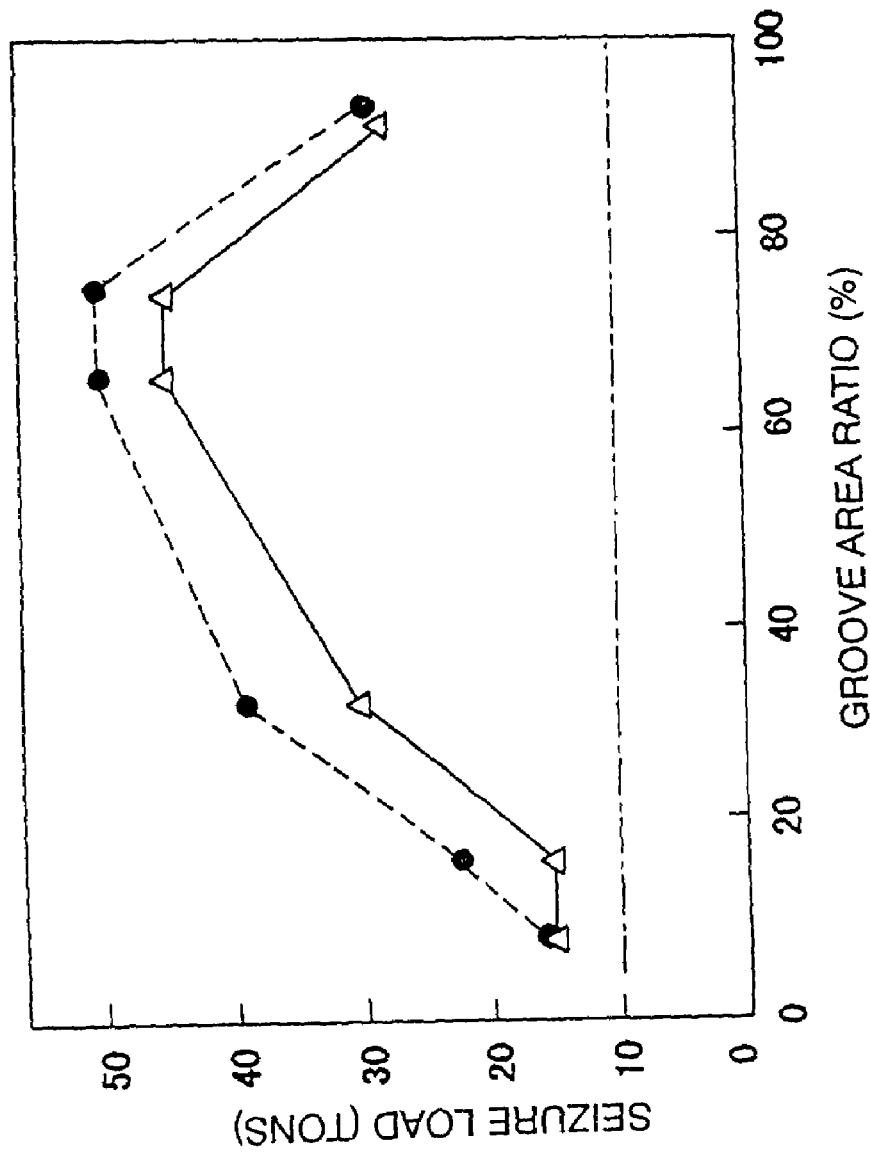
FIG. 8 is a graph showing an example of relationship between a groove area rate of the bearing and a seizure load which is a load when seizure is generated in the bearing which is a partial member constituting the bearing device of the invention.

FIG. 8 is a graph showing an example of relationship between a groove area rate of the bush 2 and a seizure load which is a load when seizure is generated in the bush 2 which is a partial member constituting the bearing device of the invention.

In FIG. 8, a graph shown with a solid line shows an example of change of a seizure load with respect to the groove area ratio of the bush 2 having straight grooves in the first embodiment, and a graph shown with a broken line in FIG. 8 shows an example of change of a seizure load of a bush 2 having helical grooves in the second embodiment. Corresponding results thereof are plotted on graphs with Δ and ●. A graph shown with a chain line shows an example of a seizure load of a conventional bush.

As apparent from FIG. 8, it can be found that if the groove area ratio of the bush 2 is maintained in a range of 30 to 90%, the seizure resistance can be enhanced to 30 tons or more. If the grooves of the bush 2 have the same groove area ratio, it can be understood that the bush 2 of the second embodiment has more excellent seizure resistance than that of the bush 2 of the first embodiment. The conventional bush cannot realize seizure resistance with respect to a load of 10 tons or more.

From the above point, it can be understood that if the groove area ratio of the bush 2 is in the range of 30 to 90%, the bush 2 having seizure resistance of 30 tons or more can be obtained. It is possible to realize seizure resistance which is largely enhanced as compared with the conventional bush.

The bearing device according to the present invention having the above-described structure were produced, and the following experiments were conducted.

Experiment Example 1

As machining conditions by a conventional NC lathe, or by a broaching machine, or kurling machining conditions by a lathe, machining intervals of the grooves were set to three values, i.e. 10° (6.1 mm, groove area ratio of 8%), 5° (3.05 mm, groove area ratio of 16%) and 2.5° (1.53 mm, groove area ratio of 32%). A plurality of arc groove portions each having a width of 0.5 mm and a depth of 0.2 mm were formed on an inner peripheral surface of a cylindrical bush 2 having an inner diameter of a cylindrical portion of 70 mm, an outer diameter of the cylindrical portion of 85 mm and a length of the cylindrical portion of 85 mm in parallel to the axial direction of the bush. These bushes 2 were subjected to quenching, and a surface hardness of the bush 2 was set to HRC 58.

Next, the bushes 2 were press-fitted two each into a bush case at a distance of 375 mm from each other in parallel, and journal shafts 1 each having a diameter of about 70 mm were mounted into the two bushes 2 and assembled. Then, grease as lubricant was circulated and supplied between the inner peripheral surfaces of the bushes 2 and the outer peripheral surfaces of the journal shafts 1 and in this state, continuous operation was carried out under conditions in which the rocking angle was 5° and the rocking speed was 5 seconds/cycle. During this continuous operation, a given load was applied to the bush 2 from outside every 600 cycles, and a load when seizure was generated was evaluated as a seizure load. Results thereof are shown in Table 1.

TABLE 1

| Groove area ratio | Interval | Seizure load |
|---|---|---|
| 8% | 10° | 14 tons |
| 16% | 5° | 14 tons |
| 32% | 2.5° | 30 tons |

Experiment Example 2

For example, as cutting by a lathe, machining intervals of the groove portions were set to 5° (3.05 mm), and a plurality of arc groove portions were formed on the inner peripheral surface of the bush 2 with an inclination angle a of 30° (groove area ratio of 19%), 60° (groove area ratio of 33%) and 75° (groove area ratio of 63%) with respect to the axial direction of the bush. Next, as in the experiment example 1, continuous operation was carried out, a load when seizure was generated was evaluated as a seizure load. Results thereof are shown in Table 2.

TABLE 2

| Groove area ratio | Interval | Seizure load |
|---|---|---|
| 19% | 30° | 22 tons |
| 33% | 60° | 38 tons |
| 63% | 75° | 50 tons |

Experiment Example 3

Under the same conditions as those in the experiment example 2, a plurality of semi-circular groove portions were formed on the inner peripheral surface of the bush 2 with an inclination angle $\alpha$ of 60° with respect to the axial direction of the bush. Next, the inner peripheral surface of the bush 2 was subjected to induction hardening. Then, as in the experiment example 2, various loads were applied to the bearing device from outside, and evaluation test was carried out. The bearing device was decomposed, and the journal shaft 1 and the bush 2 were observed. Even if a load of 50 tons was applied, no seizure was found in the inner peripheral surface of the bush 2 and the outer peripheral surface of the journal shaft 1. The lubricity, load resistance, wear resistance and seizure resistance could be maintained excellently.

Experiment Example 4

As in the experiment example 2, a plurality of semi-circular groove portions were formed on the inner peripheral surface of the bush 2 with an inclination angle $\alpha$ of 60° with respect to the axial direction of the bush. Next, the inner peripheral surface of the bush 2 was chromeplated, and a thin film having a thickness of 30 $\mu$m was formed. Then, as in the experiment example 3, various loads were applied to the bearing device from outside, and evaluation test was carried out. The bearing device was decomposed, and the journal shaft 1 and the bush 2 were observed. Even if a load of 50 tons was applied, no seizure was found in the inner peripheral surface of the bush 2 and the outer peripheral surface of the journal shaft 1.

As apparent from the above explanation, according to the bearing device of the embodiment, even if the bearing device is for low speed rocking and high load, which is mounted to a connection portion of an arm, a bucket or the like in the construction equipment or the earthmoving equipment, it is possible to ensure a rotation angle of the journal shaft 1 in the entire region from the predetermined small rocking region to large rocking region without increasing the size of the journal shaft 1 and the bush 2 and while maintaining the current sizes thereof. Also, sufficient lubricating effect can be obtained without generating the partial break of oil film or shortage of oil film between the sliding surfaces of the journal shaft 1 and the bush 2.

Therefore, it is possible to prevent wear, abrasion, seizure and the like of the sliding surfaces of the journal shaft 1 and the bush 2, and it is possible to largely enhance the endurance and seizure resistance of the sliding surfaces. As a result, with a small number of parts and a simple structure, no vibration or noise is generated and it is possible to ensure the quality of the bearing device for a long term.

The present invention is not limited to the above embodiments. Although the invention is applied to the bearing device in which the journal shaft 1 and the bush 2 mutually rotate at a predetermined angle range in the embodiments, the invention can also be effectively used for a bearing device in which the journal shaft 1 and the bush 2 relatively continuously rotate, and the invention naturally includes a technical range which can easily be modified from the embodiments by a person skilled in the art.

What is claimed is:

1. A bearing device for various kinds of machines, comprising a shaft member, which is relatively and rotatably supported by a cylindrical bearing through an oil film of lubricant, and oil-supply groove portions of the lubricant formed on a sliding surface of either one of the bearing and the shaft member, wherein an area ratio of the oil-supply groove portions to the sliding surface of either one of the bearing and the shaft member is 30 to 90%, and a length $L_1$ between the oil-supply groove portions in a circumferential direction and an inner diameter D of the bearing satisfy $L_1 < \pi D/36$.

2. A bearing device according to claim 1, wherein the oil-supply groove portions are formed on an inner peripheral surface of the bearing device.

3. A bearing device according to claim 1, wherein a surface of either one of the bearing and the shaft member is subjected to induction hardening.

4. A bearing device according to claim 1, wherein the oil-supply groove portions are inclined with respect to an axial direction of a bush at an inclination angle $\alpha$, and the inclination angle $\alpha$ is $0°<\alpha<90°$.

5. A bearing device according to claim 4, wherein the oil-supply groove portions are formed on an inner peripheral surface of the bearing device.

* * * * *